| United States Patent [19] | [11] | 4,004,050 |
|---|---|---|
| Rabito et al. | [45] | Jan. 18, 1977 |

[54] TWO-PART PRIMER SYSTEM FOR FRP BONDING

[75] Inventors: Thomas G. Rabito; Alvin J. Kieft; Richard L. Cline, all of Ashland, Ohio

[73] Assignee: The Goodyear Tire & Rubber Company, Akron, Ohio

[22] Filed: Aug. 26, 1974

[21] Appl. No.: 500,220

[52] U.S. Cl. .............................. 427/302; 156/314; 156/331; 428/424; 428/480
[51] Int. Cl.² ...................... B32B 27/40; C09J 5/02
[58] Field of Search .............. 117/47 A, 72, 76 F; 156/110 A, 314, 331; 161/190; 427/302, 407 G; 428/424, 480

[56] References Cited

UNITED STATES PATENTS

| 2,905,582 | 9/1959 | Coleman et al. | 156/314 X |
|---|---|---|---|
| 3,326,742 | 6/1967 | Shepherd | 161/227 |
| 3,647,513 | 3/1972 | Jackson | 117/47 A |
| 3,703,426 | 11/1972 | Larson et al. | 156/308 |
| 3,716,396 | 2/1973 | Shirano et al. | 117/76 T |

Primary Examiner—Charles E. Van Horn
Assistant Examiner—M. G. Wityshyn
Attorney, Agent, or Firm—F. W. Brunner; J. D. Wolfe

[57] ABSTRACT

An improved adhesion between polyester compositions per se or metals using the isocyanate-type adhesive is obtained by first treating the surface of the polyester composition and/or metal with a first and a second treating agent without regard to sequence where the first treating agent is an organic polyisocyanate and the second treating agent is a tertiary amine.

4 Claims, No Drawings

TWO-PART PRIMER SYSTEM FOR FRP BONDING

This invention relates to a method of obtaining improved adhesion between polyester compositions per se and/or metals. More specifically, this invention relates to a method of treating the surface of a polyester composition which may contain glass fiber reinforcement to enhance the effectiveness of an isocyanate adhesive.

Heretofore, in making laminates between polyester compositions per se and/or metals, it has been customary to clean the surface to be bonded with a suitable solvent to remove greases and other contaminants. This treatment has frequently resulted in a surface that would not give satisfactory bonds for some unknown reason. Therefore, to insure that a satisfactory bond is obtained under all conditions the better practice has been to sandblast the surface of the polyester composition or otherwise abrade it away and then give the surface a solvent wash. It should be readily evident that the use of a sandblasting treatment increases the cost and also presents problems due to the contamination of the surrounding area with the fines from the sandblasting treatment.

The molders of polyester compositions in recent years have tended to add compounding agents such as waxes, polyethylene, polypropylene or broadly unsaturated to saturated polymers or copolymers of olefins of 2 to 20 carbon atoms to give a finished molded polyester composition frequently referred to as "low profile" molded part. Also, the so-called "low profile" molded polyester composition responds to treatment with the treating agents of this invention to give improved laminates.

Therefore, it is an object of this invention to provide a method for obtaining improved adhesion between polyester compositions per se and/or metals and a polyester composition having a treated surface. This object and other advantages may be obtained by the practice of this invention as will be evident from the ensuing discussion.

The surface of the polyester composition is subjected to a treatment with a suitable first and second treating agent more fully described hereinafter, or preferably dissolved in a solvent. A suitable adhesive of the isocyanate type is applied to the surface of the polyester composition to be bonded or laminated and the adhesive is allowed to set or cure.

More specifically, the polyester compositions are those utilized for constructing panels or built-up objects of substantial rigidity, for instance, the use of solid polyester compositions containing glass fiber reinforcements such as those used in making automobile bodies or parts, boats, and related objects are the ones to which this invention has its primary benefit. These polyester compositions may be made by reacting suitable polycarboxylic acids or their anhydrides with suitable glycols such as ethylene, propylene, butylene and higher. For these purposes the polycarboxylic acids of the aromatic type are particularly suitable as they tend to give a more rigid composition. Specific examples of these aromatic polycarboxylic acids are phthalic, isophthalic and terephthalic. Also unsaturated polycarboxylic acids such as maleic and fumeric are utilized where it is desired to introduce a small to a relatively large amount of unsaturation in the polyester composition, especially where the composition is to be cured or set by peroxide curing, either alone or in conjunction with an unsaturated monomer or alpha olefin such as styrene or acrylonitrile, etc.

The glass fiber reinforced polyester compositions are well known and are in wide commercial use, but in general these compositions are prepared by forming a copolymer containing maleic anhydride or related unsaturated polycarboxylic acids and one of the phthalic acids or lower aliphatic dicarboxylic acids with ethylene glycol or the ether glycols such as di- or tri-ethylene glycol.

As indicated heretofore, the objects and advantages of this invention are obtained by applying in succession a treatment with two different treating agents to the clean surface of the polyester composition and/or metal, followed by application of the polyurethane adhesive, bringing the polyester composition or metal into laminating contact with another polyester composition until the adhesive has set or cured. For convenience, the different treating agents will be referred to as first and second treating agents, respectively, as this designated sequence of treatment gives preferred results. It should be appreciated the order or sequence of treatment can be reversed. Thus, the treatment in some instances can be referred to as without sequence.

Hereinafter, the term "first treating agent" will be used to designate an organic polyisocyanate or a solution of an organic polyisocyanate.

Any of the organic polyisocyanates may be used as the first treating agent to pretreat the polyester surface to enhance the adhesion. Representative classes of these are the aromatic, aliphatic, and cycloaliphatic diisocyanates and the triisocyanates such as those listed in U.S. Pat. Nos. 2,917,489 and 3,102,875.

Since the organic polyisocyanates of higher molecular weight and higher isocyanate content are more viscous or even solids, the use of a solvent as a vehicle to dissolve, dilute or lower the viscosity aids the control application during the pretreatment to the polyester or metal surface. Suitable and representative vehicles for the organic polyisocyanates are the ketones such as methyl ethyl ketone, acetone, the hydrocarbon distillates, chlorinated solvents as hydrocarbons and other solvents boiling below about 300° F. and preferably below 250° F.

The polyester composition, preferably in the form of a sheet or thin film, is treated with the first treating agent by applying the treating agent preferably dispersed or dissolved in a solvent to the surface by brushing, spraying, rolling or other suitable techniques, then allowing the solvent to evaporate to leave the treating agent deposited on the surface of the polyester composition.

It has been discovered that the benefits of this invention are obtained if the second treatment immediately follows the first treatment or if considerable time is allowed to elapse. Usually an elapse of one to several days is desirable as it gives greater freedom in scheduling the work in the plant.

The second treating agent is applied to the surface of the polyester composition by brushing, spraying, rolling or other suitable techniques and allowed to dry. Then the polyester whose surface has been so prepared is treated with a polyurethane adhesive and the two surfaces to be joined are placed in contact and maintained in contact until the adhesive has had time to laminate or bond the two compositions together.

The second treating agent for treating the surface of the polyester composition is a tertiary amine of the aliphatic, cycloaliphatic, or heteroaromatic hydrocarbon class. Representative tertiary amines are triethylene diamine, alkyl piperazines, alkyl morpholines, and dialkylated lower amines such as triethylamine. The agent or treating agent is preferably dissolved in a suitable solvent such as the ketones or halogenated hydrocarbon solvents, although any of the low boiling inert organic liquids in which the amine is soluble may be used. Usually about 0.5 to 5 or more parts of the agent is dissolved in a 100 parts of solvent, and depending on the specific activity of the tertiaryamine about one to three parts is preferred. This concentration of the treating agent in the solvent allows adhesion to be obtained with the usual application methods. Of course, it should be appreciated that higher concentrations, viz. 5 or 10 parts to even 100 percent liquid tertiaryamine can be used, but difficulty will be experienced in getting a uniform application of the tertiaryamine to the polyester surface at concentrations above 10 percent, and the cost of the treatment tends to become too expensive.

In general, washing of the polyester composition or the metals, for example, steel, copper, aluminum, magnesium and related alloys, is not necessary since the solvent in the first treating agent can function to loosen the grease and other surface contaminants to permit the isocyanate to bond to the solid polyester composition, viz. an FRP panel. Likewise, in some instances, it is preferred to treat metals with the amine treating agent before using the isocyanate treating agent. It should be noted that some of the chlorinated solvents tend to react with some tertiaryamines to form a precipitate. Consequently, the solvent solution sometimes has limited pot life and is made immediately before its use.

An adhesive of the isocyanate class can be prepared by reacting the reactive hydrogen containing materials of about 500 to 4000 with an organic polyisocyanate, a low molecular weight polyamine containing material and preferably an inert filler. The adhesive of the isocyanate class is prepared by forming a prepolymer and then mixing the prepolymer with a curative, the prepolymer being formed by the reaction of the reactive hydrogen containing material. Preferably a polypropylene ether polyol of about 1000 to 3000 molecular weight and an organic polyisocyanate containing at least two and preferably more than an average of two isocyanates per molecule. This prepolymer can contain about five to as much as 70 percent by weight of a filler based on the reactive hydrogen containing material. One of the prime functions of the inert filler such as clays, silica, etc. is to act as a viscosity increaser and also to hasten the building of green strength or tack in the adhesive. The curative may contain polyhydroxyl terminated materials of relatively low molecular weight, usually less than about 600. Representative of these materials are N,N,N', N'-(2-hydroxylpropyl) ethylene diamine or the adduct formed by reacting a material such as pentaerythritol, trimethylol, propane, trimethylol ethane and the hydroxylated sugars with alkylene oxides such as propylene oxide. These curatives may also contain in addition to the low molecular weight hydroxyl terminated or amine terminated materials, a small amount of catalysts such as the tertiary amines or the organic tin compounds. Usually the adhesives of the isocyanate class of a relatively high isocyanate to reactive hydrogen material ratio is in excess of 2.5 and preferably about 5 to 7 moles per mole. The nature of the isocyanate adhesive and the first and second treating agents is also described in U.S. Pat. Nos. 3,647,513 and 3,703, 426.

The nature of this invention may be more specifically exemplified by the following examples wherein all parts are by weight unless otherwise indicated:

EXAMPLE A

A suitable adhesive of the isocyanate class was prepared by reacting the following ingredients: 100 parts of a polypropylene ether glycol of about 2000 molecular weight having dispersed therein 60 parts of talc coated with zinc stearate and an organic polyisocyanate mixture comprising 28 parts of a polyisocyanate A and 32 parts of toluene diisocyanate where polyisocyanate A is the phosgenated mixture obtained by phosgenation of the rearrangement product of the reaction of aniline and formaldehyde as taught in U.S. Pat. No. 2,683,730.

This prepolymer was then mixed in a two-compartment pressure adhesive gun with a curative comprising 30.8 parts N,N,N', N'-(2-hydroxylpropyl) ethylene diamine and 13.2 parts of a propylene oxide adduct of pentaerythritol of about 400 molecular weight to form the adhesive.

EXAMPLE B

Another adhesive of the isocyanate class was prepared by reacting 100 parts polypropylene ether glycol of 2000 molecular weight having dispersed therein 63 parts of zinc stearate coated talc with an isocyanate mixture comprising 29.8 parts of a polyisocyanate A and 33.7 parts of toluene diisocyanate. This prepolymer was mixed with a curative to form an adhesive. The curative was formed by mixing 49.6 parts of a propylene oxide adduct of ethylene diamine of about 500 molecular weight with 12.4 parts of a propylene oxide adduct of pentaerythritol of about 500 molecular weight.

EXAMPLE I

A five percent by weight solution of polyphenyl methane polyisocyanate (available from the supplier under the name PAPI) in a chlorinated naphtha having a boiling point below 250° F. was spray applied to clean dry automobile grade polyester fiber glass test panels and allowed to dry at room temperature for 30 minutes.

Then the test panels were spray coated with a one percent by weight solution of triethylene diamine in methyl ethyl ketone. The panels were allowed to dry at room temperature for 30 minutes before being coated with the isocyanate adhesive of Example A. The panel containing the isocyanate adhesive was covered with a second panel in cross relationship and held in this relationship for 24 hours to develop the cross laminate bond.

The cross laminate specimens were subjected to a pull test in an "Instron" test machine at test temperatures indicated below:

| Test Temperature | Bond Failure, p.s.i. |
|---|---|
| 75° F. | 680* |
| 180° F. | 390 |
| 250° F. | 237 |

| Test Temperature | Bond Failure, p.s.i. |
|---|---|
| −40° F. | 808* |

*This cross laminate failed due to polyester delaminating.

These bond strengths represent approximately a 75 percent improvement in bond strength over those where no primer treatment was used.

The sequence of primer use above can be reversed, but Example I exemplifies the preferred sequence. Also, the chlorinated hydrocarbon organic polyisocyanate solutions of 2 to 10 percent are normally used.

While certain representative embodiments and details have been shown for the purpose of illustrating the invention, it will be apparent to those skilled in this art that various changes and modifications may be made therein without departing from the spirit or scope of the invention.

What is claimed is:

1. A method for improving the adhesion between an adhesive of the isocyanate class and a polyester composition comprising treating the surface of the polyester composition with a first and second treating agent without regard to sequence and then applying an adhesive of the isocyanate class and curing said adhesive, said first treating agent being an organic polyisocyanate and the second treating agent being a tertiary amine.

2. The method of claim 1 wherein the organic polyisocyanate is a phosgenation product of the rearranged product of the reaction of aniline and formaldehyde.

3. The method of claim 1 wherein the tertiary amine is triethylene diamine.

4. The method of claim 1 wherein the adhesive is of the isocyanate class, obtained by reacting organic polyisocyanate with polypropylene ether glycol.

* * * * *